United States Patent
Mailoa et al.

(10) Patent No.: US 11,515,573 B2
(45) Date of Patent: Nov. 29, 2022

(54) BATTERY SYSTEMS AND METHODS FOR ACCELERATING ION DIFFUSION IN POLYMER ELECTROLYTE MATERIALS

(71) Applicants: Robert Bosch GmbH, Stuttgart (DE); MASSACHUSETTS INSTITUTE OF TECHNOLOGY, Cambridge, MA (US)

(72) Inventors: Jonathan Mailoa, Cambridge, MA (US); Alfredo Alexander-Katz, Cambridge, MA (US); Zhen Cao, New York, NJ (US)

(73) Assignees: Robert Bosch GmbH, Stuttgart (DE); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 188 days.

(21) Appl. No.: 16/864,487

(22) Filed: May 1, 2020

(65) Prior Publication Data

US 2021/0344053 A1 Nov. 4, 2021

(51) Int. Cl.
*H01M 10/42* (2006.01)
*H01M 10/0585* (2010.01)
*H01M 10/0565* (2010.01)

(52) U.S. Cl.
CPC ... *H01M 10/4235* (2013.01); *H01M 10/0565* (2013.01); *H01M 10/0585* (2013.01); *H01M 2300/0082* (2013.01)

(58) Field of Classification Search
None
See application file for complete search history.

(56) References Cited

U.S. PATENT DOCUMENTS 6,214,251 B1 4/2001 Wu et al.
2016/0365600 A1* 12/2016 Lohmann ............ H01M 10/052

FOREIGN PATENT DOCUMENTS

KR 20040092332 A 11/2004

OTHER PUBLICATIONS

B. Kumar, P. T. Weisman and R. A. Marsh, "The effect of mechanical excitation on performance of polymer batteries," IEEE 35th International Power Sources Symposium, 1992, pp. 275-278, doi: 10.1109/IPSS.1992.282027. (Year: 1992).*
Benders, S., et al., "Mapping oscillating magnetic fields around rechargeable batteries," J. Magn. Res. 319 (2020) 106811. (Year: 2020).*
Electric-Field-Directed Parallel Alignment Architecting 3D Lithium-Ion Pathways within Solid Composite Electrolyte Xueqing Liu, Sha Peng, Shuyu Gao, Yuancheng Cao, Qingliang You, Liyong Zhou, Yongcheng Jin, Zhihong Liu, and Jiyan Liu ACS Applied Materials & Interfaces 2018 10 (18), 15691-15696. (Year: 2018).*

(Continued)

*Primary Examiner* — Alix E Eggerding
(74) *Attorney, Agent, or Firm* — Brooks Kushman P.C.

(57) ABSTRACT

Battery systems and methods for accelerating ion diffusion in polymer electrolyte materials. The application of oscillating electric fields is used to improve the ionic transport properties of polymer electrolytes by reducing the apparent hopping barrier of the lithium ions within the electrolyte material. Polymer-electrolyte-based battery cells exhibiting enhanced ion mobility due to the application of such oscillating electric fields.

20 Claims, 7 Drawing Sheets

(56) References Cited

OTHER PUBLICATIONS

M. Woods and J. Batchelor, "Low-profile Slot Antenna integrated with a thin polymer non-metallic battery," 2013 Loughborough Antennas & Propagation Conference (LAPC), 2013, pp. 441-445, doi: 10.1109/LAPC.2013.6711938. (Year: 2013).*
P.L. Cheang et al.; 2010 IOP Conf., Series: Matererials Science and Engineering 11; Jan. 2003; 7 pages.
Chintapalli et al., "Structure and Ionic Conductivity of Polystyrene-block-poly(ethylene oxide) Electrolytes in the High Salt Concentration Limit," Macromolecules, vol. 49, No. 5, 2016, 11 pages, DOI: 10.1021/acs.macromol.5b02620.
Grabert et al., "Quantum Tunneling in Dissipative Systems at Finite Temperatures," Physical Review Letters, vol. 52, No. 25, Jun. 18, 1984, pp. 2193-2196.
Nakamura et al., "Thermodynamics of Ion-Containing Polymer Blends and Block Copolymers," Physical Review Letters, vol. 107, Nov. 1, 2011, 6 pages, DOI: 10.1103/PhysRevLett.107.198301.
Panday et al., "Effect of Molecular Weight and Salt Concentration on Conductivity of Block Copolymer Electrolytes," Macromolecules, vol. 42, No. 13, 2009, pp. 4632-4637, DOI: 10.1021/ma900451e.
Van Den Broeck et al., "Efficiency of isothermal molecular machines at maximum power," Physical Review Letters, vol. 108, May 22, 2012, 6 pages, DOI: 10.1103/PhysRevLett.10.210602.
Youngs et al., "Application of Static Charge Transfer within an Ionic-Liquid Force Field and Its Effect on Structure and Dynamics," ChemPhysChem, vol. 9. No. 11, Aug. 4, 2008, pp. 1548-1558, https://doi.org/10.1002/cphc.200800200.

* cited by examiner

BATTERY SYSTEMS AND METHODS FOR ACCELERATING ION DIFFUSION IN POLYMER ELECTROLYTE MATERIALS

TECHNICAL FIELD

The present disclosure is generally directed to battery systems and methods for accelerating ion diffusion in polymer electrolyte materials. More specifically, the present disclosure relates to polymer-electrolyte-based battery cells exhibiting enhanced ion mobility due to the application of oscillating electric fields and methods relating to same.

BACKGROUND

Lithium-ion batteries—which operate based on the movement of lithium ions between a negative electrode (the anode) and a positive electrode (the cathode)—have become the industry standard in both electric mobility and portable electronics applications. In light of their widespread use, increasing the performance and efficiency of lithium-ion batteries is a focus of industry research. While there have been a number of recent advancements in connection with the materials and designs of the anode and cathode components, it has proved difficult to identify and develop new electrolyte materials that exhibit requisite characteristics including high conductivity and stability under harsh operating conditions. Accordingly, traditional liquid electrolytes continue to find widespread use in lithium-ion batteries despite a number of shortcomings such as, for example, relatively short lifespans and limited volumetric energy density. Traditional liquid electrolyte-based lithium-ion batteries can also pose significant safety risks when damaged.

In view of these and other limitations of traditional liquid electrolytes, the use of polymer electrolytes in conjunction with lithium battery cells are of great interest. Incorporation of such materials in place of traditional liquid electrolytes promises several potential advantages such as superior energy density, mechanical properties, and flexibility along with enhanced safety. Despite these promises, significant research has failed to identify polymer electrolyte materials capable of displacing liquid electrolytes as the industry standard. Additionally, many polymeric chemicals identified for potential use have shown worse conductive properties than the most common lithium-ion conducting polymer: polyethylene oxide (PEO). Low ionic diffusivity is often a characteristics of polymer electrolyte materials due to the fact that lithium ions bind strongly to polymer chains present in the electrolyte. Materials, systems, and methods for improving the conductivity of polymer electrolytes are necessary to help overcome the obstacles to advantageously implementing polymer electrolytes in lithium batteries.

SUMMARY

According to one embodiment, an electrochemical cell is disclosed. The electrochemical cell includes an anode configured to absorb and release lithium ions, a cathode, and a separator polymer electrolyte. The electrochemical cell further includes an electric field-imparting device configured to be charged and discharged to impart an oscillating electric field within at least a portion of the separator polymer electrolyte. The electric field-imparting device may be configured to impart an oscillating electric field having a frequency of between 1 and 100 GHz and an amplitude of between $1e^{-6}$ and 0.001 V/Å. In accordance with some other nonlimiting examples, the electric field-imparting device may be configured to impart an oscillating electric field having a frequency of between 2 and 10 GHz and an amplitude of between $1e^{-4}$ and $1e^{-2}$ V/Å. The electric field-imparting device may also be disposed partly or entirely within the separator polymer electrolyte material of the electrochemical cell.

In an alternative embodiment, a solid state polymer battery is disclosed. The battery includes an anode, a cathode, a separator polymer electrolyte, and an electric field-imparting structure disposed at least partially within the separator polymer electrolyte and configured to impart an oscillating electric field within at least a portion of the separator polymer electrolyte. The electric field-imparting structure may comprise a cable mesh formed by a plurality of metal wires. Alternatively, the electric field-imparting structure may comprise a plurality of micro radio frequency circuits. In other examples, the electric field-imparting structure may comprise a plurality of antennas.

In yet another embodiment, a method of increasing the ionic diffusivity of a polymer electrolyte material within a polymer electrolyte battery cell is disclosed. The method comprises configuring an electric field-imparting structure to be repeatedly charged and discharged to impart an oscillating electric field in at least a region of the polymer electrolyte battery cell, placing the electric field-imparting structure at least partially within a polymer electrolyte material of the polymer electrolyte battery cell, and charging and discharging the electric field-imparting structure to impart an oscillating electric field in at least a portion of the polymer electrolyte material.

DETAILED DESCRIPTION

Figure 1:
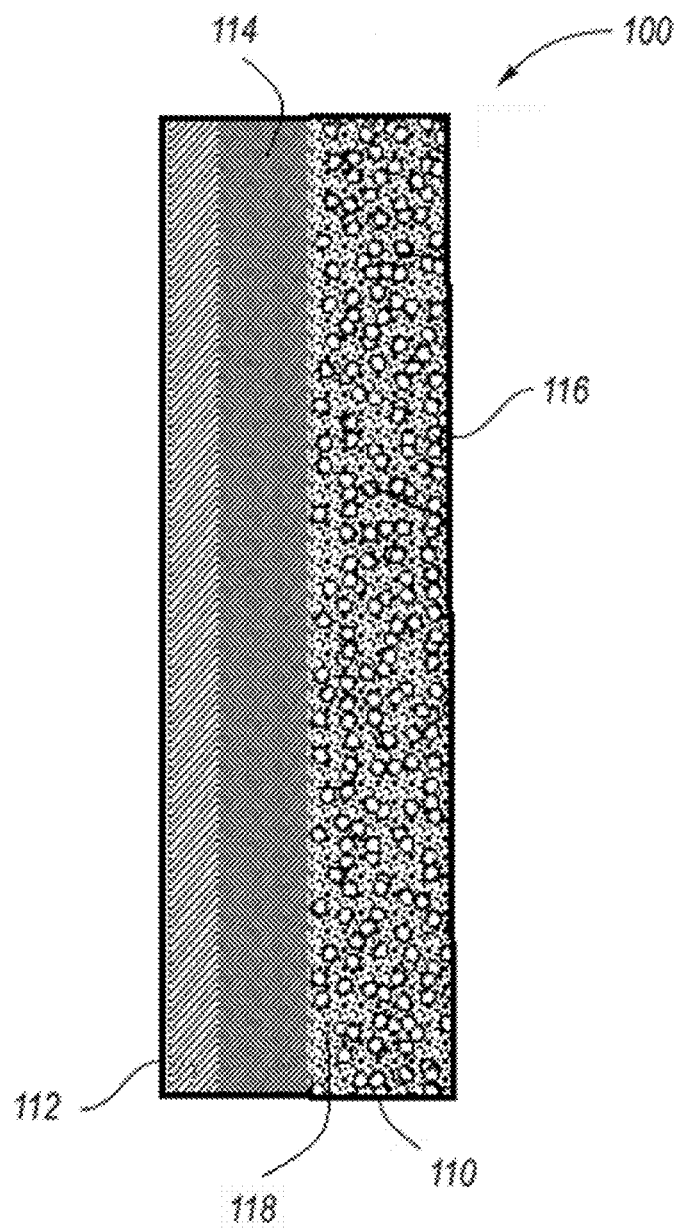
FIG. 1 is a schematic depiction of a lithium-ion battery including a polymer electrolyte in accordance with various embodiments.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description and does not necessarily preclude chemical interactions among constituents of the mixture once mixed.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

In this disclosure, the terms "negative electrode" and "anode" are both used to mean "negative electrode." Likewise, the terms "positive electrode" and "cathode" are both used to mean "positive electrode."

Reference is being made in detail to compositions, embodiments, and methods of embodiments known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5%, or 10% of the value or relative characteristic.

The combination of high energy and power density exhibited by lithium-ion batteries has made them the default choice for a wide range of applications across numerous industries. In addition to their nearly-ubiquitous use in consumer electronics and electric vehicle applications, the high energy efficiency of lithium-ion batteries may also provide for their effective use in a range of electric grid applications, including improving wind, solar, geo-thermal and other renewable-source energy quality. In accordance with its current widespread use and potential for further expansion, lithium-ion batteries are of intense interest to many industries. To support the continued expansion of lithium-ion battery technology, optimizing the materials, models, and methods employed in conjunction with lithium-ion batteries is a key area of research.

Despite their prevalence, traditional lithium-ion batteries—which include liquid electrolytes—exhibit certain disadvantages. These disadvantages continue to drive interest in alternative battery types. One of the alternatives to traditional lithium-ion batteries are lithium-ion batteries that employ polymer electrolyte materials. Polymer electrolyte batteries may be more flexible, thinner, and provide greater energy per unit weight than traditional lithium-ion batteries. They may also be safer than traditional lithium-ion batteries due to the replacement of the liquid electrolyte.

Despite the promise of polymer electrolytes, low ionic diffusivity has proved an obstacle to their widespread use in place of liquid electrolytes. Although numerous strategies for enhancing the conductivity of polymer electrolytes have been proposed—including altering counter ions and tuning molecular architectures by introducing co-polymer or brush-polymer—many of the proposed polymers fail to surpass the conductivity exhibited by polyethylene oxide (PEO), the most common polymer electrolyte material. Increasing the ionic diffusivity of polymer electrolyte materials, including that of PEO, is often challenged by the fact that lithium ions bind strongly to polymer chains present in the electrolyte. A significant amount of time is required for a lithium ion to escape from the cage formed by negatively charged atomic species—oxygen atoms in the case of PEO—and move to a different cage. Because ionic diffusion is greatly determined by the segmental motion of the polymer chain, lithium-ion diffusion in polymer electrolytes is often slow in comparison to diffusion in liquid electrolyte materials. In addition to such limitations inherent to the polymer materials themselves, simulation efforts have provided only limited insight into key features that control the mobility of ions in the polymer matrices.

The battery systems and methods disclosed herein address the conductivity issue associated with polymer electrolytes by increasing ionic diffusivity in such materials through the application of an oscillating electric field. As further detailed below, imposing an oscillating electric field into the electrolyte reduces the apparent hopping barrier of the lithium ions, which thereby provides enhanced ion diffusion within the polymer electrolyte. In order to take advantage of the phenomenon of resonant activation—in which small changes in the height of hopping barriers associated with ion diffusion can lead to significant increases in the hopping frequency of the ions—the frequency of the oscillating electric field must be high enough to prevent formation of a double layer on electrodes. As described herein, formation of a double layer on electrodes operates to dramatically screen the applied electric field, thereby reducing its effectiveness.

In accordance with one or more embodiments, application of an oscillating electric field that applies a force on the ions of the order of the thermal force can lead to increases in the diffusion constant for the ions of up to approximately three orders of magnitude. Because the applied fields are periodic, no net ballistic motion in one direction is obtained while fast diffusion is achieved in all directions—i.e., parallel and perpendicular to the applied field. The systems and methods disclosed herein provide a new and effective approach to enhance the mobility of the ions in polymer electrolytes for use in any number of different applications. The systems and methods disclosed herein can be advantageously applied to any application in which ionic diffusion through a polymer membrane is a desired property. While the present disclosure focuses on the effect of oscillating electric fields on the diffusion of lithium ions within polymer electrolytes of lithium-ion batteries, the utility of the disclosed embodiments is not limited to lithium-ion batteries.

A schematic example embodiment of a battery or battery cell according to one or more embodiments disclosed herein is depicted in FIG. 1. As can be seen in FIG. 1, a battery/battery cell 100 includes a cathode 110, an anode 112, and a separator electrolyte 114. Cathode 110 may include active material particles 116 surrounded by catholyte 118. Catholyte 118 may provide ionic communication between separator electrolyte 114 and cathode active particles 116. Catholyte 118 may act as a binder of active material particles 116.

Battery 100 may be a lithium or lithium-ion cell. Anode 112 active material may include any of a variety of materials depending on the type of chemistry for which the battery cell 100 is designed. Anode 112 material may include any material that can serve as a host material (i.e., can absorb and release) lithium ions. Examples of such materials include, but are not limited to graphite, lithium metal, and lithium alloys such as Li—Al, Li—Si, Li—Sn, and Li—Mg, Si and silicon alloys of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr), and mixtures thereof. Alternatively, graphite, metal oxides, silicon oxides, or silicon carbides may also be used as anode 112 materials.

Separator electrolyte 114 may include any suitable polymer material or material mixture including, but not limited to, PEO, ester-based polymers, other polymers that include polar groups, and other polymer materials disclosed herein. Separator electrolyte 114 may include a mixture of polymers of various structures and compositions. In some embodiments, the described polymer electrolytes may be used as analytes only in the anode. In such arrangements, the electrolytes may be mixed with anode 112 material such as graphite. It may also be useful to include the polymer electrolytes described herein in cathode 110 to improve interfacial ionic transfer between cathode 110 and separator electrolyte 114. Electronically conductive block copolymers may be added to cathode 110. Examples include, but are not limited to, block copolymers of PPE and electronically conductive polymers such as polythiophene, polyvinylphenylene, polyaniline, polypyrrole, polyacetylene, polyphenylene sulfide, poly(3,4-ethylenedioxythiophene) (pedot), or polyfluorenes. In some embodiments, polymer electrolyte material may be used as catholytes only in the cathode. In such arrangements, the electrolytes may be mixed with cathode active material.

According to at least one embodiment, the polymer electrolyte material does not include additives and the polymer electrolyte is a dry polymer. In other embodiments, additional species can be added to the polymer electrolytes described herein to enhance ionic conductivity, mechanical properties, or other properties that may be desirable. To improve conductivity, one or more additives in the ionically conductive phase can be added to the polymer electrolyte material, for example. Such additives can improve ionic conductivity by lowering the degree of crystallinity, lowering the melting temperature, lowering the glass transition temperature, or increasing chain mobility. High dielectric additives can aid dissociation of the salt, thereby increasing the number of Li+ ions available for ion transport. Ionic-conductivity-enhancing additives include low molecular weight conductive polymers, ceramic particles, room temp ionic liquids, high dielectric organic plasticizers, and Lewis acids. Other additives can also be readily used in the polymer electrolyte material.

In other embodiments, ceramic electrolytes are added to the block copolymer. Non-limiting examples of additive ceramic electrolytes that can be used include lithium silicate, lithium borate, lithium aluminate, lithium phosphate, lithium phosphorus oxynitride, lithium silicosulfide, lithium borosulfide, lithium aluminosulfide, and lithium phosphosulfide, lithium lanthanum titanium oxide, lithium lanthanum zirconium oxide, LiPON, LiSICON, $Li_{10}SnP_2S_{12}$, $Li_{11}Si_2PS_{12}$, $Li_{10}GeP_2S_{12}$, $Li_2S$—$SiS_2$—$Li_3PO_4$, $Li_{14}Zn(GeO_4)_4$, $Li_2S$—$P_2S_5$, $La_{0.5}Li_{0.5}TiO_3$, combinations thereof, and others known to those of skill in the art.

The cathode active material may be any of a variety of materials depending on the type of chemistry for which the battery cell 100 is designed. Cathode active material particles 116 may include one or more of the following: sulfur, microstructured carbon/sulfur composites, lithium peroxides, metal alloys of lithium, or organometallic molecules. For example, the cathode active material particles may include lithium iron phosphate ($LiFePO_4$, LFP), $LiCoO_2$, $LiMn_2O_4$, lithium nickel cobalt aluminum oxide (LiNiCoAlO_2, NCA), lithium nickel cobalt manganese oxide (LiNiMnCo, NCM), or any combination thereof. Additional examples of cathode active materials include, but are not limited to materials described by the following general structure (I):

$$Li_xA_{1-y}M_yO_z \quad (I),$$

where
A is at least one transition metal such as Mn, Co, and Ni,
M is B, Mg, Ca, Sr, Ba, Ti, V, Cr, Mn, Fe, Co, Ni, Cu, Al, In, Nb, Mo, W, Y, and Rh, or a combination thereof,
x is $0.05 \leq x \leq 1.1$, and
y is $0 \leq y \leq 0.5$.
An example cathode active material is $LiNi_{0.5}Mn_{0.5}O_2$.
Alternatively, the cathode active material may be described by the following general structure (II):

$$Li_xMn_{2-y}M_yO_2 \quad (II),$$

where
M is Mn, Ni, Co, Cr, or a combination thereof,
x is $0.05 \leq x \leq 1.1$, and
y is $0 \leq y \leq 2$.
Alternatively still, the cathode active material may be described by the following general structure (III):

$$Li_xM_yMn_{4-y}O_2 \quad (III),$$

where
M is Fe, Co, or both,
x is $0.05 \leq x \leq 2$, and
y is $0 \leq y \leq 4$.
Further still, the cathode electrode active material may be described by the following general structure (IV):

$$Li_x(Fe_yM_{1-y})PO_4 \quad (IV),$$

where
M is chosen from transition metals such as Mn, Co and/or Ni,
x is $0.9 \leq x \leq 1.1$, and
y is $0 \leq y \leq 1$.
In yet another embodiment, the cathode active material may be described by the following general structure (V):

$$Li(Ni_{0.5-x}Co_{0.5-x}M_{2x})O_2 \quad (V),$$

Figure 2:
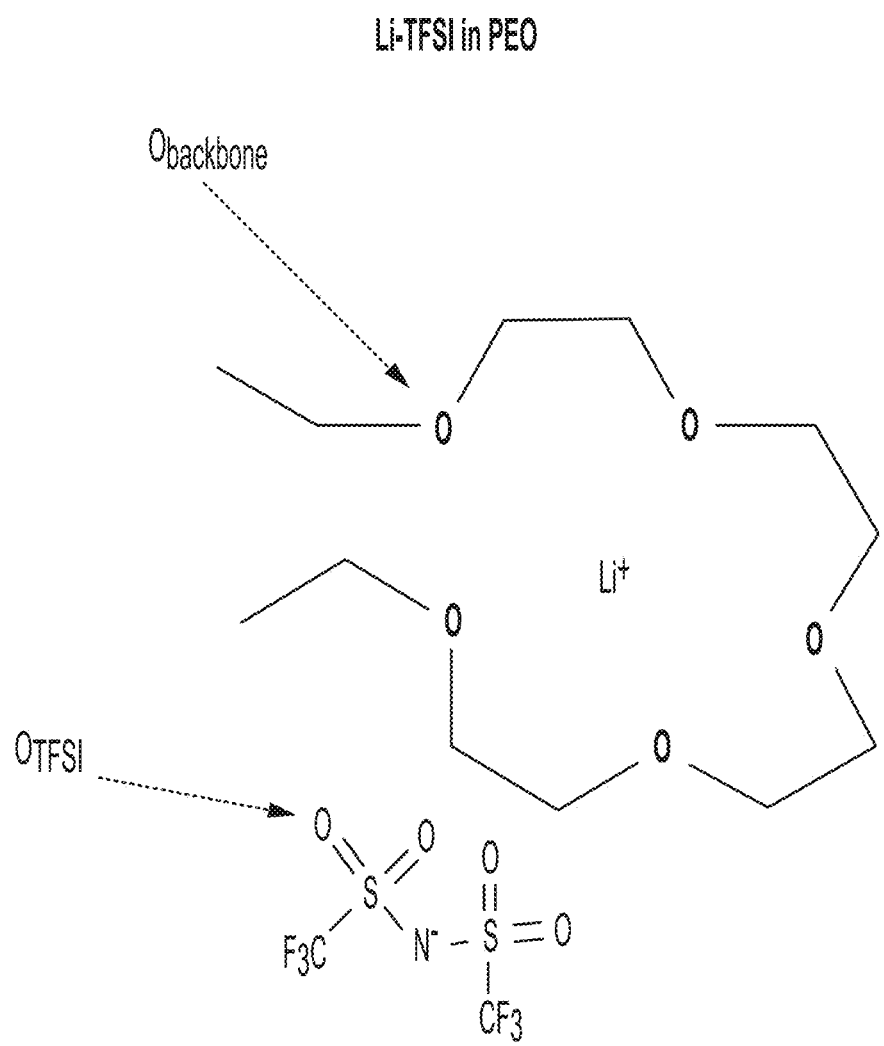
FIG. 2 is a graphical representation of the coordination between positively-charged lithium ions and the negatively-charged species present in polymer electrolyte materials such as PEO.
Figure 3:
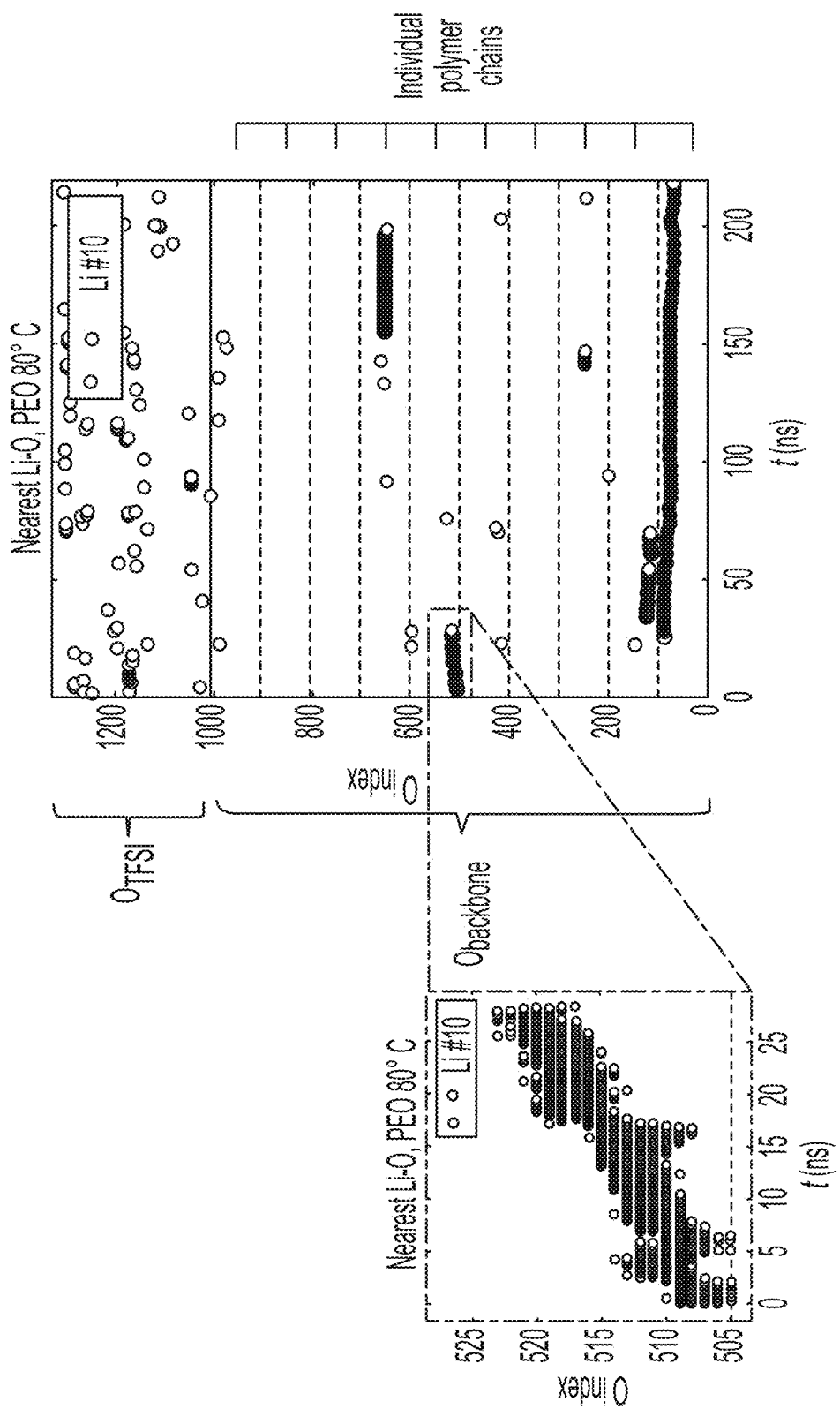
FIG. 3 is a graph depicting a representative snapshot of the degree of lithium ion coordination with oxygen atoms in PEO.

where
M is chosen from Al, Mg, Mn, and/or Ti,
and x is $0 \leq x \leq 0.2$.
Anions in the electrolyte material—such as bistriflimide (TFSI) in PEO as shown in FIG. 2—form local traps or cages around the lithium ions, which act to increase the diffusion barrier thereby slowing the diffusion of lithium ions within the polymer electrolyte material. As depicted in FIG. 2, the oxygen atoms of the TFSI anions form a backbone structure surrounding the lithium cation. The resulting coordination of lithium ions and consecutive oxygen atoms in the example of PEO reduce the potential for lithium ions to hop and thereby negatively affects the conductivity of the battery cell. FIG. 3 is a graph depicting a representative snapshot of the degree of lithium ion coordination with oxygen atoms in PEO with 30 wt % Li-TFSI at 80° C. The example shown in FIG. 3 was created using molecular dynamics simulations. As demonstrated by FIG. 3, individual lithium ion hops rarely occur in the system due to the effect of the local ionic traps, slowing ion diffusion in the electrolyte. Specifically, FIG. 3 shows the index of closest oxygen atom to one of the lithium ions in a system with 10 PEO chains over the simulation time. Most of the time, the lithium coordinates with oxygen atoms from the same chain, and simply rattles in its close proximity or original oxygen coordination cage for tens of nanoseconds. Very occasionally (for example at time around 25 ns), the ion escapes that local cage into an oxygen coordination cage on a separate chain, which contributes to the desired ionic diffusion through the electrolyte.

Figure 4:
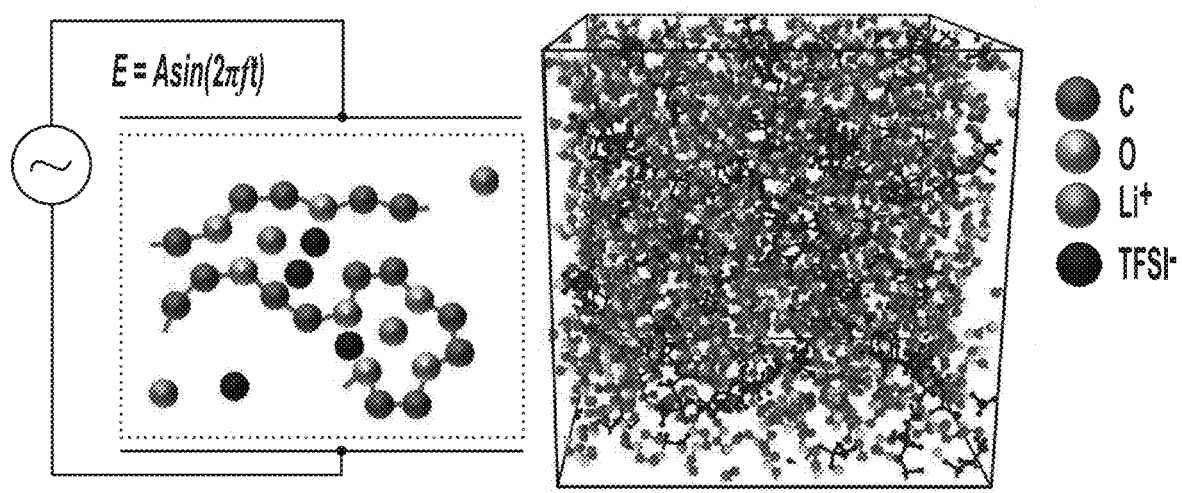
FIG. 4 is a schematic representation of the application of an oscillating electric field to a polymer electrolyte material.

As described in greater detail below, atomistic molecular dynamics simulations of lithium salts in polymer electrolyte materials can be effectively applied to achieve insight into the effect of external electric field on the dynamic properties of such systems. FIG. 4A shows a schematic representation of the application of an oscillating electric field to a polymer electrolyte material—specifically, PEO in the example shown in FIG. 4A. The field is cycled using a sinusoidal wave at a given frequency f, and the magnitude of the field, A, is controlled independently. FIG. 4B shows a representative snapshot of the simulated system, where lithium ions tend to be strongly coordinated by the oxygen atoms in the PEO chains.

The diffusivity of carriers directly impacts the conductivity exhibited by an electrolyte system such as a lithium-ion battery cell. At dilute concentrations, the ion conductivity of a given electrolyte system is proportional to the number of carriers (i.e., salt concentration) and the diffusion constant. At higher concentrations, the ion conductivity of the system depends on the effective number of carriers. Despite this distinction, the diffusivity of carriers continues to play a critical role in overall conductivity of the system. The diffusion of lithium ions in polymer electrolyte materials is typically between 2 and 3 orders of magnitude less than that of lithium ions in liquid electrolytes. In light of this, widespread adoption of polymeric electrolytes for use in battery applications has not occurred despite the benefits associated with a move away from liquid electrolytes.

As noted above, the dynamics of lithium ions within polymer electrolytes can be effectively studied by utilizing all atom molecular dynamics simulations according to established protocols. Atomistic molecular dynamics simulations of LiTFSI salt in PEO melts were carried out using OPLS 2005 force field parameters. To achieve the best fit of ion conductivity within the simulation, partial charges on lithium ions were rescaled by 0.6 as contemplated in T. Youngs and C. Hardacre, "Application of Static Charge Transfer within an Ionic-Liquid Force Field and Its Effect on Structure and Dynamics," *Chem Phys Chem*, vol. 9, no. 11, pp. 1548-1558. Partial charges on counterions were redistributed as shown in Table 1, below. The simulated system was composed of 10 PEO chains with a degree of polymerization (DP) of 100 and 80 Li$^+$/TFSI$^-$ pairs, thus the ion concentration r equals 0.08. The system is equilibrated for 20 ns until radius of gyration of polymer chain becomes saturated. All simulation runs were carried out in the canonical (NVT) ensemble. The constant temperature is maintained by coupling the system to a Nose-Hoover thermostat at T=353 K with a damping coefficient of 1 ps. The atoms' equations of motion were integrated using the velocity Verlet algorithm with time step of 1.0 fs. The standard PPPM method with accuracy of $10^{-5}$ and near field cutoff set to 1.2 nm was used to account for the long-range electrostatic interactions. Simulations were performed using LAMMPS accelerated by a GPU package.

TABLE 1

Summary of Partial Charges Assigned to LiTFSI

| Atom | Li | C | F | S | O | N |
|---|---|---|---|---|---|---|
| Charge | +0.6 | +0.326 | −0.134 | +0.826 | −0.406 | −0.476 |

To study the effects of an external electric field on the dynamic properties of polymer electrolytes, an oscillating field along the z direction can be applied to the simulated box of the LiTFSI-PEO system shown in FIG. 4B in accordance with the following equation:

$$E(t)=A\sin(2\pi ft) \quad (1),$$

where A is the amplitude and f is the frequency of the sinusoidal field. The external force acting on each charged atom is thus F=E·q. The amplitude was varied from 0.05 to 0.5 V/Å and the frequency from 10 GHz to 100 THz. The oscillation field was applied for 200 ns, during which 20,000 configurations were collected for data analysis.

Figure 5A:
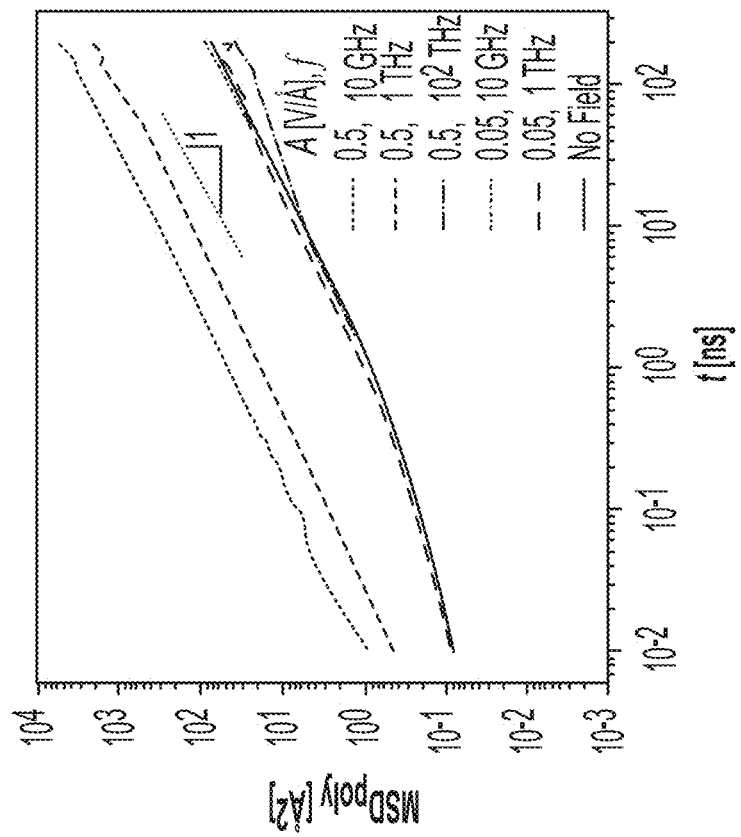
FIGS. 5A and 5B are graphs showing the mean square displacement (MSD) of lithium ions and polymers within a polymer electrolyte system as function of time.
Figure 5B:
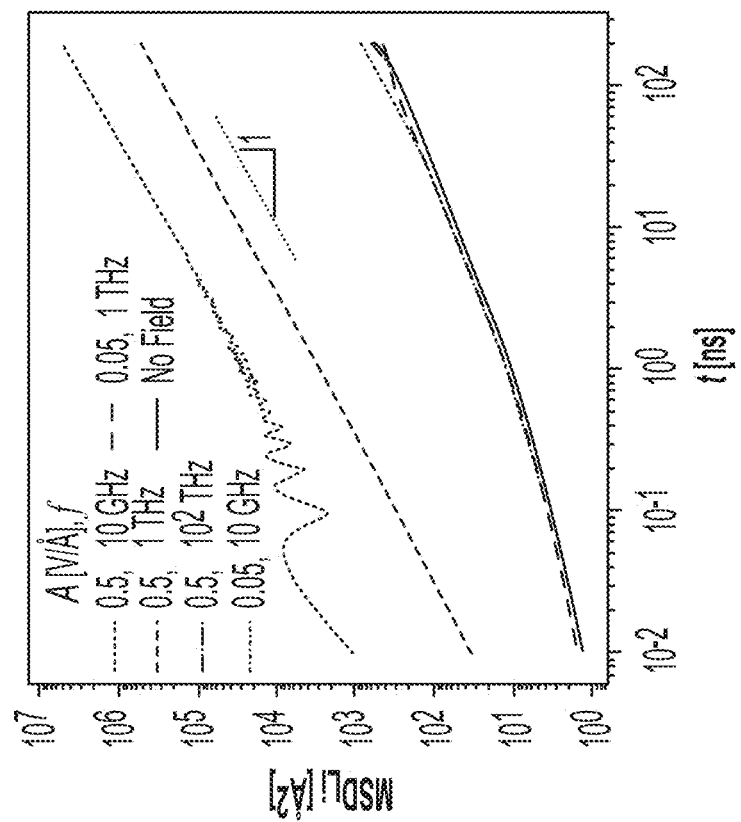

In accordance with one or more embodiments herein, the ionic diffusivity of polymer electrolyte materials is increased through the introduction of oscillating electric fields, thereby increasing the ion diffusion and conductivity of battery cells and systems employing polymer electrolytes. FIGS. 5A and 5B are graphs respectively showing the mean square displacement (MSD) of lithium ions and polymer chains within a polymer electrolyte system under the presence of an oscillating electric field according to certain embodiments. FIGS. 5A and 5B demonstrate, for example, that the ionic diffusivity of the polymer electrolyte system is significantly increased when field amplitude of the applied oscillating electric field is 0.5 V/Å and its frequency of oscillation is less than or equal to 1 THz. As shown in FIGS. 5A and 5B, the polymer electrolyte system exhibits clear and significant increases in ionic diffusivity where A=0.5 V/Å and f=10 GHz or 1 THz, for example. However, at some higher oscillating field frequencies—such as when f=100 THz, for example—the polymer electrolyte system does not exhibit similar increases in ionic diffusion as demonstrated by the other MSD curves shown in in FIGS. 5A (lithium ions) and 5B (polymers). Under such conditions, the polymer electrolyte system does not have time to respond to the applied electric field and thus exhibits diffusive transport characteristics similar to those systems in which no field has been applied.

As further shown in FIGS. 5A and 5B, the MSD curves for each example system reach the diffusive regime. In systems subjected to oscillating electric fields of relatively-high amplitude and relatively-low frequency, the diffusive regime is reached more rapidly. Thus, despite the force applied by an oscillating field of A=0.5 V/Å and f=100 THz, for example, ionic transport in systems subject to such a field is not super-diffusive because the MSD curves reach a diffusive regime rapidly—thereby indicating that the field "rattles" the ions without leading to a net increase in ionic transport.

Figure 6A:
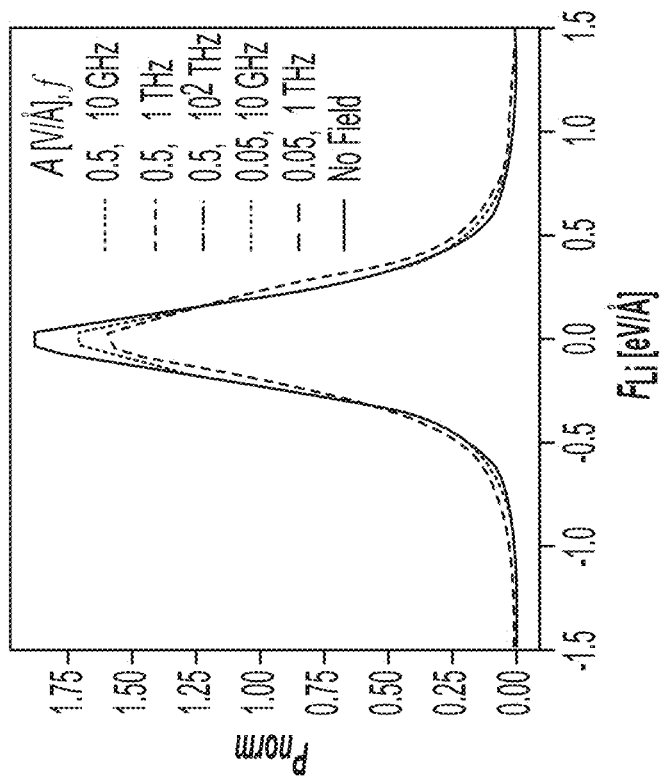
FIGS. 6A and 6B are graphs showing force distributions on lithium ions and oxygen atoms in polymer electrolyte systems including those subjected to oscillating electric fields.
Figure 6B:
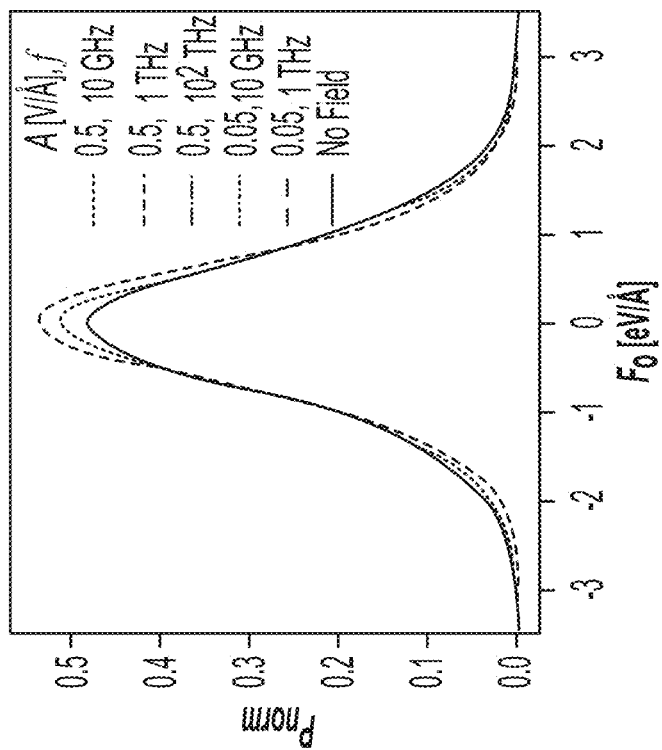

To better understand the forces involved in these polymer electrolyte systems, the force distributions on the lithium ions and the oxygen atoms in the polymer can be analyzed. FIG. 6A is a graph showing force distributions on lithium ions in polymer electrolyte systems subjected to various oscillating electric fields. Similarly, FIG. 6B is a graph showing force distributions on oxygen atoms in PEO in such systems subjected to various oscillating electric fields. The probability has been normalized in connection with the data shown in FIGS. 6A and 6B. As demonstrated by these figures, the applied oscillating electric fields have a negligible effect on the force distributions except for cases when the amplitude of the applied oscillating electric field is 0.5 V/Å and its frequency of oscillation is either 10 GHz or 1 THz. In the examples where A=0.5 V/Å and f is less than or equal to 1 THz, there are small but noticeable changes in the tails of the distributions for both the lithium ions (FIG. 6A) and the oxygen atoms (FIG. 6B). As can be seen, the effect of the applied oscillating electric fields in these cases is rather small. In the spirit of resonant activation, these variations can be understood as small variations in the height of the hopping barriers to which the lithium ions are subject. Accordingly, the lithium-ion hopping barriers are closer and closer in frequency to the natural first passage time of the lithium ions in the absence of the oscillating field. That is, the applied oscillating field has an increasingly-significant impact on the occurrence of lithium-ion hopping the closer the frequency of the oscillating field is to the natural frequency of the lithium-ion oscillation in the polymer in the absence of the oscillating field.

Figure 7:
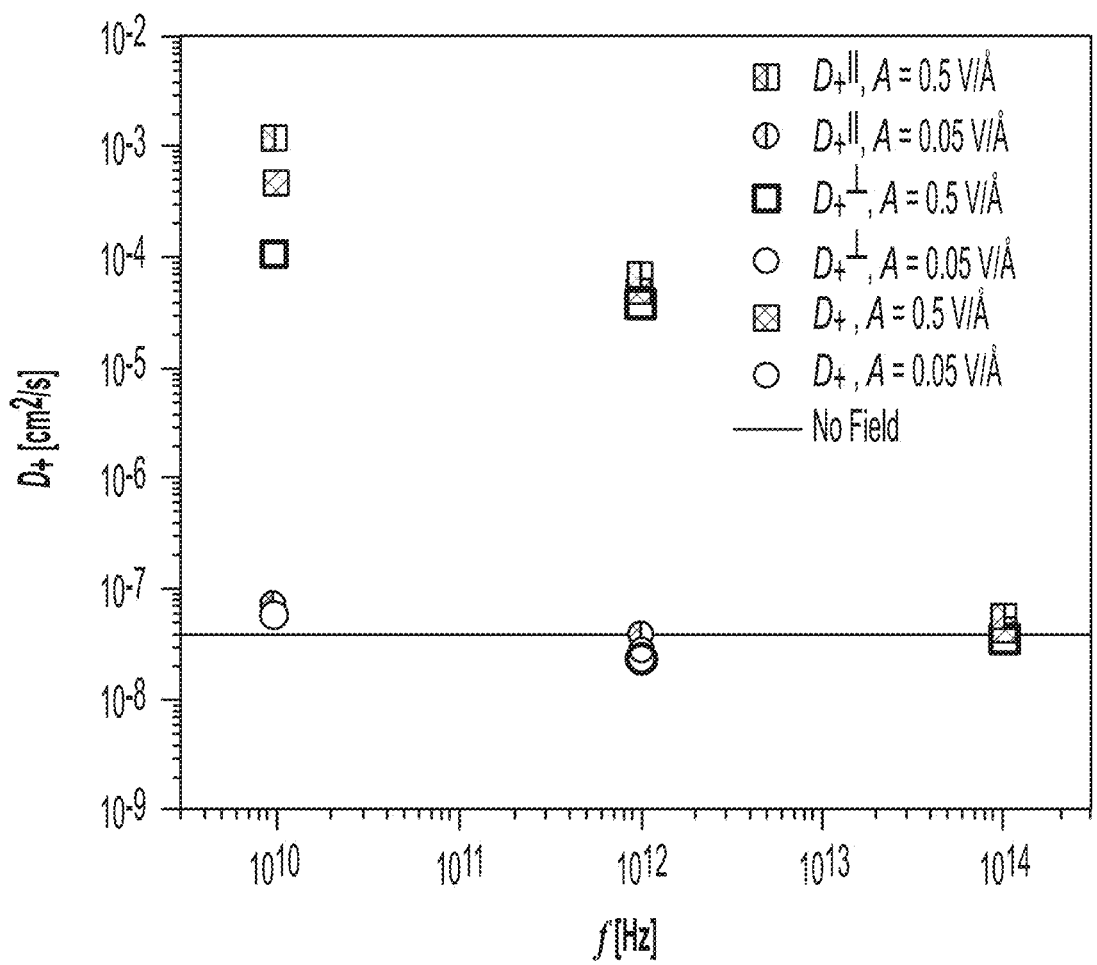
FIG. 7 is a graph illustrating the dependence of the diffusion coefficient of lithium ions on the frequency of an applied oscillating electric field.

Based on the fact that transport is diffusive, at least a portion of the ionic-mobility gains may be translated to the dimension orthogonal to that in which the oscillating field is applied. FIG. 7 shows a graph illustrating the dependence of the diffusion coefficient of lithium ions on the frequency of an applied oscillating electric field. FIG. 7 shows the computed diffusion coefficient, $D_+$, in both parallel and perpendicular directions with respect to the electric field for polymer electrolyte systems subjected to different electric fields. The diffusion is typically measured by calculating the mean squared displacement (MSD) over time. The MSD in this case is calculated by averaging the squared displacement of individual lithium ion coordinates (projected along the direction parallel to or perpendicular to the electric field) after a given time t:

$$|(\vec{r}_{Li}(\tau+t) - \vec{r}_{Li}(\tau))_{projected}|^2 \quad (2)$$

As demonstrated by the data shown in FIG. 7, the diffusion constants perpendicular to the direction of applied electric field are nearly as high as those parallel to the direction of applied electric field, except at the lowest frequency where one expects to find chain alignment. FIG. 7 confirms, for example, that each of the diffusion constants for frequencies below 1 THz exhibit an increase of more than 3 orders of magnitude with respect to the polymer electrolyte system in which no oscillating electric field is applied.

In accordance with various embodiments, methods for accelerating ion diffusion in polymer electrolyte materials, and in batteries/battery cells incorporating such materials, include applying an oscillating electric field having a frequency of between 100 MHz and 100 THz. In accordance with other embodiments, the methods involve application of oscillating electric fields having frequencies of between 500 MHz and 1 THz. In accordance with one or more embodiments, the method involves application of an oscillating electric field having a frequency of between 1 GHz and 100 GHz. According to still other embodiments, the method involves application of an oscillating electric field having a frequency of between 2 GHz and 10 GHz.

Additionally, according to one or more embodiments, the method of accelerating ion diffusion in polymer electrolyte materials and/or batteries/battery cells incorporating polymer electrolyte materials, include applying an oscillating electric field characterized by a field amplitude of between $1e^{-7}$ V/Å and 1 V/Å. According to other embodiments, the applied oscillating electric field is characterized by a field amplitude of between $1e^{-6}$ V/Å and 0.001 V/Å. According to still other embodiments, the applied oscillating electric field is characterized by a field amplitude of between $1e^{-4}$ V/Å and $1e^{-2}$ V/Å.

In accordance with various embodiments herein, lithium-ion batteries/battery cells are disclosed. According to one or more embodiments, the lithium-ion battery/battery cell includes a cathode, an anode, and a separator polymer electrolyte material having one or more mesh cable structures disposed therein. The mesh cable structures may be metal wire mesh configured to carry electric current. According to certain embodiments, the one or more mesh cable structures is at least partially contained within the separator polymer electrolyte and is configured to be charged and discharged so as to impart an oscillating electric field within at least a portion of the separator polymer electrolyte. In some embodiments, the mesh cable structure (s) may be entirely contained in the separator polymer electrolyte of the lithium-ion battery. The disclosed lithium-ion batteries may comprise one or more battery cells each having a cathode, an anode, and a separator polymer electrolyte. In battery configurations involving multiple cells, the mesh cable structure at least partially contained within the separator polymer electrolyte and configured to be charged and discharged so as to impart an oscillating electric field within at least a portion of the separator polymer electrolyte may be included in one or more of the individual battery cells. In accordance with various embodiments, the mesh cable structure may further be configured to impart an oscillating electric field having a frequency of between 100 MHz and 100 THz, between 500 MHz and 1 THz, between 1 GHz and 100 GHz, and/or between 2 GHz and 10 GHz. In accordance with various embodiments, the mesh cable structure may further be configured to impart an oscillating electric field characterized by an amplitude of between $1e^{-7}$ V/Å and 1 V/Å, between $1e^{-6}$ V/Å and 0.001 V/Å, and/or between $1e^{-4}$ V/Å and $1e^{-2}$ V/Å.

In one nonlimiting example, one or more micro radio frequency circuits may be used to impart an oscillating electric field within at least a portion of the separator polymer electrolyte. In accordance with various embodiments, the micro radio frequency circuits may further be configured to impart an oscillating electric field having a frequency of between 100 MHz and 100 THz, between 500 MHz and 1 THz, between 1 GHz and 100 GHz, and/or between 2 GHz and 10 GHz within at least a portion of the separator polymer electrolyte. In accordance with various embodiments, the micro radio frequency circuits may further be configured to impart an oscillating electric field characterized by an amplitude of between $1e^{-7}$ V/Å and 1 V/Å, between $1e^{-6}$ V/Å and 0.001 V/Å, and/or between $1e^{-4}$ V/Å and $1e^{-2}$ V/Å within at least a portion of the separator polymer electrolyte.

In other embodiments, antennas may be used to impart an oscillating electric field within at least a portion of the separator polymer electrolyte. In some configurations, such antennas may be inserted at least partially into the separator polymer electrolyte material may further be configured to impart an oscillating electric field having a frequency of between 100 MHz and 100 THz, between 500 MHz and 1 THz, between 1 GHz and 100 GHz, and/or between 2 GHz and 10 GHz within at least a portion of the separator polymer electrolyte. In accordance with various embodiments, the antennas may further be configured to impart an oscillating electric field characterized by an amplitude of between $1e^{-7}$ V/Å and 1 V/Å, between $1e^{-6}$ V/Å and 0.001 V/Å, and/or between $1e^{-4}$ V/Å and $1e^{-2}$ V/Å within at least a portion of the separator polymer electrolyte.

Various embodiments may include more than one type of electric field-imparting device or structure. In accordance with at least one embodiment, for example, the disclosed lithium-ion battery cells may include both a mesh cable structure and one or more micro radio frequency circuits for imparting an oscillating electric field within at least a portion of the separator polymer electrolyte. In other embodiments, the disclosed lithium-ion battery cells may include both a mesh cable structure and one or more antennas for imparting an oscillating electric field within at least a portion of the separator polymer electrolyte. In other embodiments, the disclosed lithium-ion battery cells may include one or more micro radio frequency circuits and one or more antennas for imparting an oscillating electric field within at least a portion of the separator polymer electrolyte. In yet other embodiments, the disclosed lithium-ion battery cells may include one or more mesh cable structures, one or more micro radio frequency circuits, and one or more antennas for imparting an oscillating electric field within at least a portion of the separator polymer electrolyte.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electrochemical cell comprising:
   an anode configured to absorb and release lithium ions;
   a cathode;
   a separator polymer electrolyte; and
   an electric field-imparting device configured to be charged and discharged to impart an oscillating electric field within at least a portion of the separator polymer electrolyte.

2. The electrochemical cell of claim 1, wherein the electric field-imparting device is partially disposed within the separator polymer electrolyte.

3. The electrochemical cell of claim 1, wherein the electric field-imparting device is entirely disposed within the separator polymer electrolyte.

4. The electrochemical cell of claim 1, wherein the electric field-imparting device comprises a metal wire mesh structure.

5. The electrochemical cell of claim 1, wherein the electric field-imparting device comprises a plurality of micro radio frequency circuits.

6. The electrochemical cell of claim 1, wherein the electric field-imparting device comprises a plurality of antennas.

7. The electrochemical cell of claim 1, wherein the electric field-imparting device is configured to impart an oscillating electric field having a frequency of between 1 and 100 GHz and an amplitude of between $1e^{-6}$ and 0.001 V/Å.

8. The electrochemical cell of claim 1, wherein the electric field-imparting device is configured to impart an oscillating electric field having a frequency of between 2 and 10 GHz and an amplitude of between $1e^{-4}$ and $1e^{-2}$ V/Å.

9. A solid state polymer battery comprising:
   an anode;
   a cathode;
   a separator polymer electrolyte; and
   an electric field-imparting structure disposed at least partially within the separator polymer electrolyte and configured to impart an oscillating electric field within at least a portion of the separator polymer electrolyte.

10. The solid state polymer battery of claim 9, wherein the electric field-imparting structure is configured to impart an oscillating electric field having a frequency of between 1 and 100 GHz and an amplitude of between $1e^{-6}$ and 0.001 V/Å.

11. The solid state polymer battery of claim 9, wherein the electric field-imparting structure is configured to impart an oscillating electric field having a frequency of between 2 and 10 GHz and an amplitude of between $1e^{-4}$ and $1e^{-2}$ V/Å.

12. The solid state polymer battery of claim 10, wherein the electric field-imparting structure is a cable mesh comprising a plurality of metal wires configured to be charged and discharged.

13. The solid state polymer battery of claim 11, wherein the electric field-imparting structure comprises a plurality of micro radio frequency circuits.

14. A method of increasing the ionic diffusivity of a polymer electrolyte material within a polymer electrolyte battery cell, the method comprising:
   configuring an electric field-imparting structure to be repeatedly charged and discharged to impart an oscillating electric field in at least a region of the polymer electrolyte battery cell;
   placing the electric field-imparting structure at least partially within a polymer electrolyte material of the polymer electrolyte battery cell; and
   charging and discharging the electric field-imparting structure to impart an oscillating electric field in at least a portion of the polymer electrolyte material.

15. The method of claim 14, wherein the electric field-imparting structure is charged and discharged at regular intervals to produce an oscillating electric field having a frequency of between 1 GHz and 100 THz.

16. The method of claim 14, wherein the electric field-imparting structure is charged and discharged at regular intervals to produce an oscillating electric field having an amplitude of between $1e^{-6}$ and 0.001 V/Å.

17. The method of claim 14, wherein the electric field-imparting structure is charged and discharged at regular intervals to produce an oscillating electric field having a frequency of between 2 and 10 GHz.

18. The method of claim 14, wherein the electric field-imparting structure is charged and discharged at regular intervals to produce an oscillating electric field having an amplitude of between $1e^{-4}$ and $1e^{-2}$ V/Å.

19. The method of claim 14, wherein the electric field-imparting structure comprises a plurality of metal wires configured to define a cable mesh structure.

20. The method of claim 14, wherein the electric field-imparting structure comprises a plurality of micro radio frequency circuits.

\* \* \* \* \*